United States Patent [19]
Felburn

[11] 3,966,222
[45] June 29, 1976

[54] VEHICLE SUSPENSIONS

[76] Inventor: J. Phil Felburn, P.O. Box 2344, Arlington, Va. 22202

[22] Filed: Oct. 23, 1974

[21] Appl. No.: 517,367

[52] U.S. Cl. .............................. 280/685; 267/20 A; 280/724
[51] Int. Cl.² ........................................ B60G 11/16
[58] Field of Search ................. 267/20 A, 20 R, 60, 267/61, 62; 280/104.5 R, 124 R, 124 A

[56] References Cited
UNITED STATES PATENTS

| | | | |
|---|---|---|---|
| 2,576,824 | 11/1951 | Bush | 267/20 A |
| 3,239,236 | 3/1966 | Flowers | 280/104.5 R |
| 3,411,806 | 11/1968 | Bellairs | 267/60 X |

Primary Examiner—Philip Goodman
Attorney, Agent, or Firm—Michael Williams

[57] ABSTRACT

The improved suspension is adapted for use with a wheel or wheels supported on single or double axles.

The suspension comprises a mounting for the axle whereby the latter may move vertically, the mounting being connected to the vehicle frame and including a curved conduit in which a coil spring is disposed. The convolutions of the spring engage the inner wall surface of the curved conduit so that the coil spring is axially flexed to follow the curvature of the conduit. One end of the spring bears against the axle and the other spring end bears against abutment means which is adjustably disposed within an end of the curved conduit.

The construction above described may be used in a double axle suspension wherein a compression rod is disposed between facing movable abutment means, to provide an equalizing suspension.

14 Claims, 8 Drawing Figures

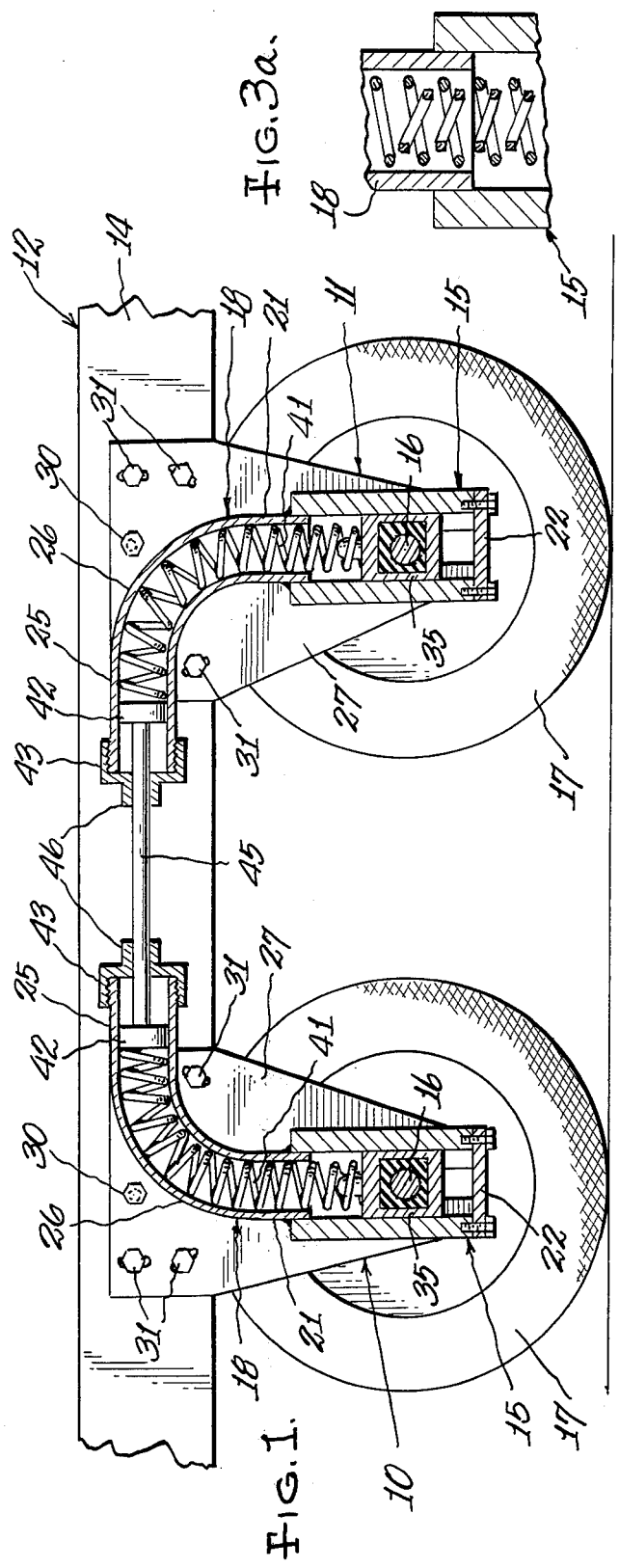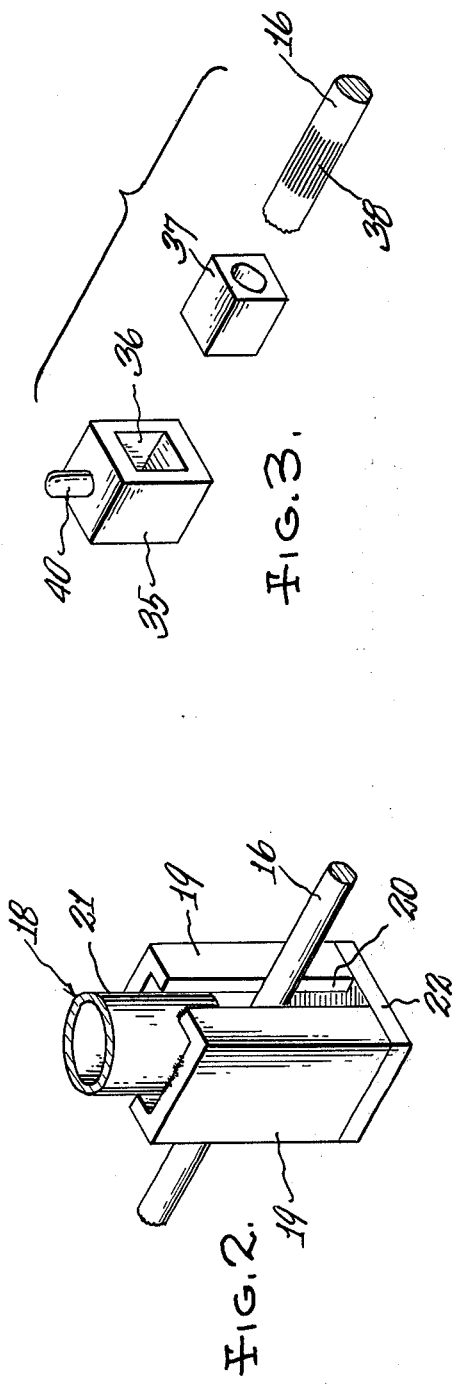

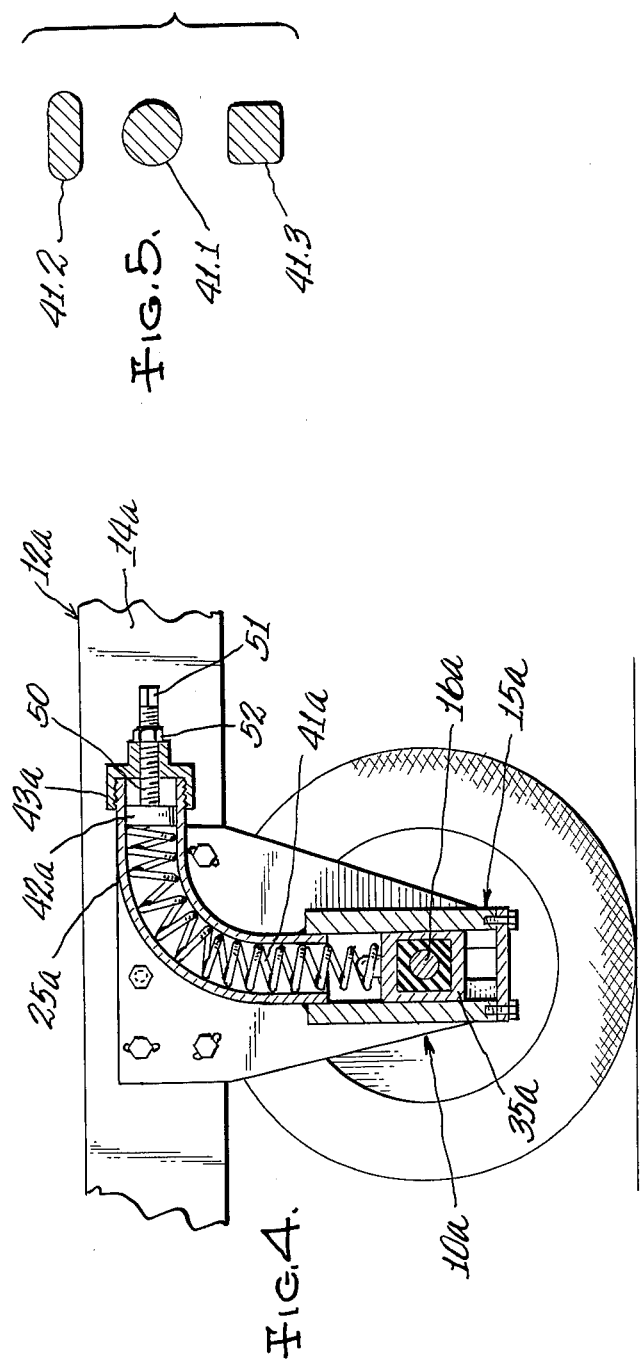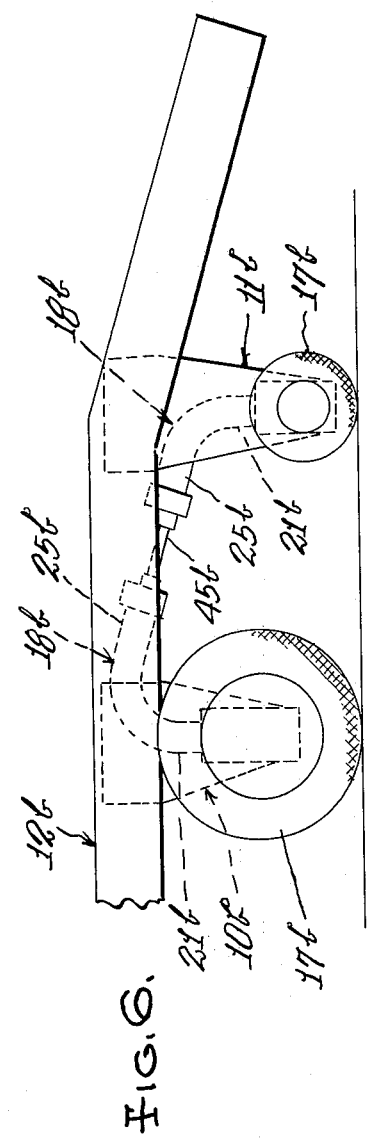

3,966,222

VEHICLE SUSPENSIONS

BACKGROUND AND SUMMARY

Practically all vehicle suspensions now in use employ either leaf springs or coil springs, and both of these types of springs have serious limitations. In coil spring suspensions, where the spring is flexed along a rectilinear axis, shock absorbers are required and these wear out quickly because of the free flexing action of the spring. Leaf spring suspensions are still in common use, but they require shackle connection with the frame and in practically all cases also require shock absorbers to dampen flexing vibrations.

In most of the above types of suspensions (coil and leaf spring) radius rods are required to hold the axle in predetermined position and to control braking torque or power torque, or both. My improved suspension eliminates the need for radius rods and practically eliminates the need for shock absorbers.

My invention includes a basic component which may be used singly for a single wheel supported on a stub axle, or in pairs for a pair of wheels supported on a single axle, or in multiples for wheels supported on double axles. Therefore, my invention provides simple construction which readily adapts itself to mass production.

The drag of friction has been long considered a detriment in vehicle design, and yet my invention makes good use of such drag, much the same as use is made thereof in leaf spring constructions wherein it is preferred that the leaves remain unlubricated so that they frictionally drag one over the other. However, my invention eliminates the relatively costly leaf springs, and their shackle connections to the vehicle frame, by disposing a coil spring, which normally flexes along a rectilinear axis, into a curved conduit. The convolutions of the spring engage the inner wall surface of the conduit and thus axially flex the coil spring to follow the curvature of the conduit. Therefore, force applied to either end of the spring, will cause the convolutions to frictionally drag over the conduit wall surface to oppose free flexing of the spring along its now-curved axis.

DESCRIPTION OF THE DRAWINGS

In the drawings accompanying this specification and forming a part of this description, there are shown, for purposes of illustration, various embodiments which my invention may assume, and in these drawings:

FIG. 1 is a fragmentary, vertical sectional view taken longitudinally of a vehicle, showing an equalizing suspension, FIG. 2 is a fragmentary, perspective view of certain parts shown in FIG. 1, FIG. 3 is a separated perspective view of certain other parts shown in FIG. 1, FIG. 3a is a fragmentary sectional view of a coil spring arrangement, FIG. 4 is a fragmentary vertical sectional view taken longitudinally of a vehicle, showing stub or single axle suspension, FIG. 5 illustrates various cross-sections which the convolutions of the coil springs may assume, FIG. 6 is a fragmentary side elevational view of a vehicle, drawn to reduced scale, showing the invention applied to a "beaver tail" type vehicle.

DESCRIPTION OF THE PREFERRED EMBODIMENT

Figure 7:
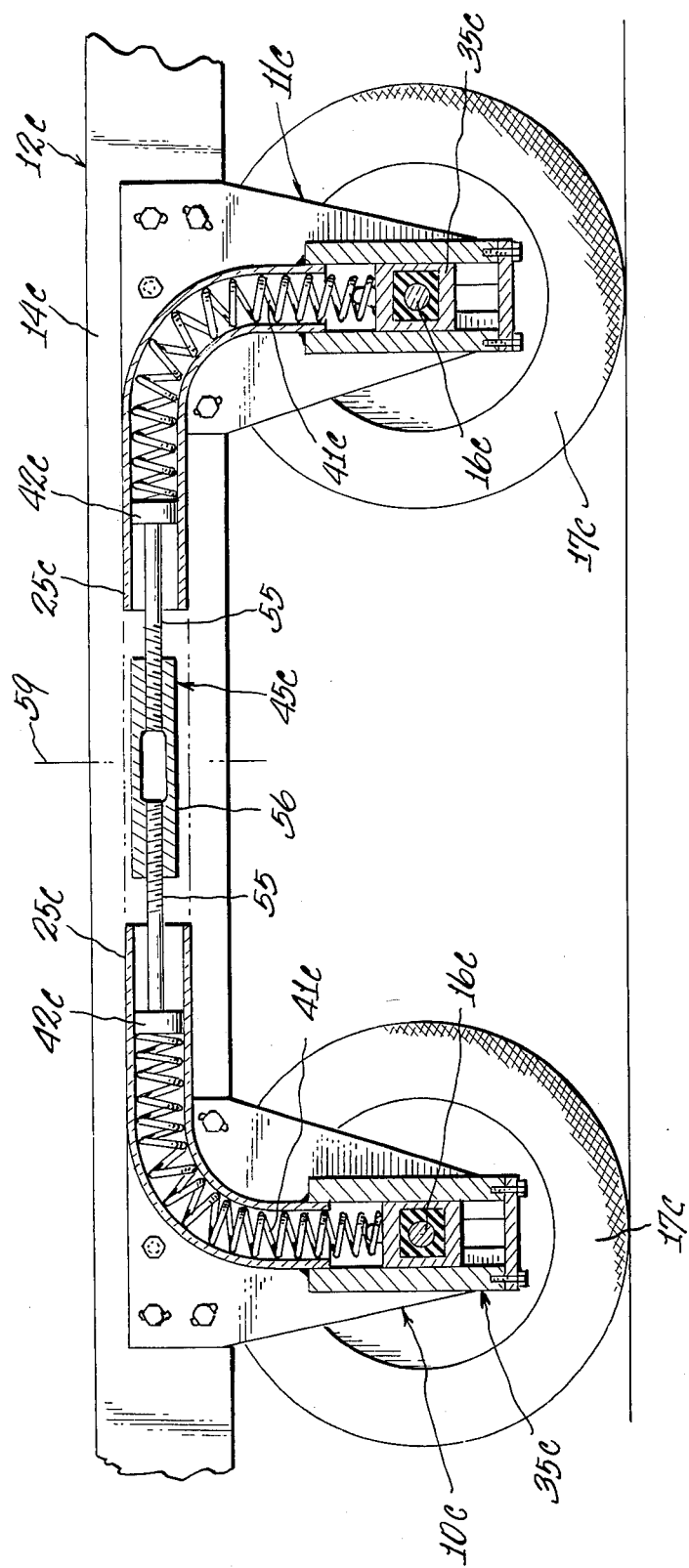
FIG. 7 is a view similar to FIG. 1 and further including means to provide adjustment for various purposes.

Referring particularly to FIGS. 1 through 3, the equalizing suspension therein shown comprises a pair of similar mountings 10 and 11, connected in spaced manner to a frame 12 of a vehicle of any type. The vehicle may be an automobile, a truck, trailer, tractor, or railway car, to name a few. In the illustrated embodiment, the mountings are connected to laterally spaced, longitudinally extending channel beams 14 of a truck or trailer. Only one beam 14 is shown in FIG. 1 and it will be appreciated that similar mountings 10 and 11 are secured to the other beam in paired alignment with the mountings on the beam that is shown.

Each mounting 10 and 11 comprises an axle housing 15 which receives and supports a respective end portion of a conventional axle 16. Wheels 17 are connected to the axle in conventional manner, the wheels shown in FIG. 1 being rubber-tired wheels for roadway engagement. It will be appreciated that the type of wheels will be varied in accordance with the type of vehicle to which the suspension is connected. Extending upwardly from each axle housing 15 is a curved conduit 18.

Each axle housing may be formed, as shown in FIG. 2, as a pair of relatively heavy-wall channels 19—19, arranged with their legs facing, but spaced, to provide an upright slot 20 in which the axle may move vertically, such as when both wheels on an axle strike a road bump. In the event only one wheel strikes a bump, the slots 20 in the laterally aligned housings will permit the axle to tilt.

The curved conduit 18 is formed from metal tubing having a wall thickness heavy enough to withstand the requirements of the suspension. The conduit has a lower rectilinear portion 21 which is welded into the upper part of the axle housing and therefore holds the upper ends of the channels 19—19 in fixed relation. The lower ends of the channels are held in fixed relation by a plate 22 which is bolted thereto.

Each conduit 18 has an upper rectilinear portion 25 integrally joined to the lower portion by an intermediate curved portion 26. In the embodiment illustrated in FIG. 1, the portion 26 is curved to dispose the axes of end portions 21 and 25 at right angles, but such angle may be varied, as will appear later.

The assembly of the axle housing and conduit 18 is welded to a heavy steel plate 27, and the latter is in turn bolted to a respective frame beam 14. In order to provide for axle alignment, the plates 27 are adjustably connected to the beams 14. As seen in FIG. 1, one bolt 30 snugly fits through a hole in the plate 27 to provide a pivot point, and the other bolts 31 pass through arcuate slots in the plate to accommodate movement of the plate about the pivot point. It will be noted that the axle 16 is disposed some distance below the pivot point so that only a slight amount of turn about the pivot will result in substantial movement of the axle. It is preferable to pivotally adjust each of the plates 27 only a slight amount and axle alignment may be effected by shifting one plate 27 about its pivot in one direction, and shifting the laterally aligned plate in the opposite direction, and then tightening all bolts when axle alignment has been reached.

The facing channels 19—19 of the axle housing 15 define a slide recess which is rectangular in cross-section (preferably square as shown), and a metal slide block 35 of complementary cross-section is disposed within the slide recess for vertical movement through a distance defined by abutment with the cover plate 22 in a lower direction, and abutment with the inner end of the conduit portion 21 in an upper direction.

The slide block 35 has a transverse opening 36 which is square in cross-section to closely receive a rubber block 37. That part of the axle end portion which is received in a respective axle housing 15 is splined, or has a non-circular cross-section, as shown at 38 in FIG. 3, and the rubber block is molded over this axle portion and thereby held against rotation on the axle. The rubber block permits a limited amount of movement of the axle to accommodate tilting and twisting action of the latter.

Extending upwardly from the slide block 35 is a projection 40 for holding the lower end of a coil spring 41 in centered relation with respect to the slide recess of the axle housing 15. The coil spring may be of a commercially available type and before assembly in the conduit, its longitudinal axis is rectilinear. As the spring is moved into the conduit 18, its convolutions slidably engage the inner wall surface of the latter so that the spring is flexed axially to conform to the curvature of the conduit. The convolutions of the coil spring may take various cross-sections, as suggested in FIG. 5.

An abutment 42, herein shown as a metal disc, is slidably disposed within the upper rectilinear portion 25 of the conduit. Although the open end of conduit portion 25 need not be covered, it is preferable to provide an end cap 43 threaded on such open end to exclude dirt, mud and other matter that might affect free sliding movement of the disc 42.

As seen in FIG. 1, the suspension comprises a pair of mountings 10, 11 connected to one longitudinal beam 14 of the frame. A similar pair (not shown) will be connected to the other longitudinal beam of the frame in lateral alignemnt with respective ones of the pair illustrated. It will be noted that the mountings 10 and 11 are identical, but are connected to the frame in reversed relation so that the rectilinear portions 25 of the conduits 18 face and are generally axially aligned, but are spaced from each other.

A force transmitting means is disposed between the paired discs 42—42, and such means may take the form of a metal compression rod 45 which may, or may not, have its opposite ends connected to respective discs. When end caps 43 are used, these caps may have a bearing portion 46 for guiding the rod 45.

In operation, when the left hand wheel (FIG. 1) strikes an obstruction in the road, it will be urged upwardly, to cause the slide block 35 to move upwardly and compress the coil spring 41. Free flexing action of the spring, (which is objectionable in a coil spring which has a rectilinear axis) is restricted by action of the convolutions dragging through the curved portion 26 of the conduit 18, but this dragging action delays transmission of forces through the spring convolutions for just a short time, so that a reaction force appears on the left-hand disc 42 to urge the compression rod 45 to the right. The rod, in turn, forces the right-hand disc 42 inwardly of its conduit 18 to compress its spring 41. Again, as before, flexing action of the right-hand spring is restricted in free flexing action by the drag of its convolutions through its conduit, but in short time the compressive force of the spring will be applied to the right-hand slide block 35 to force it, and its axle downwardly. Each pair of mountings on respective frame beams 14 act independently of each other. Thus, if only the wheel 17 of a mounting 10 on one beam 14 strikes a road obstruction, the wheel 17 of the laterally spaced mounting 10 on the other frame beam will be unaffected since the axle 16 will merely tilt. Flexing of the rubber blocks 37 will prevent telescopic binding of the slide blocks 35 in their slide recesses.

It is recognized that in the bending of cylindrical tubes, the tube has a tendency to become slightly eliptical at the curved portion 26, but this is no objection since the spring need not fit within the tube with close tolerance. As a matter of fact, some tolerance is desirable since a coil spring, along its rectilinear portions, has a tendency to increase slightly in diameter as it is compressed. On the other hand, the convolutions of the spring, in the curved portion 26 of the conduit, tend to spread apart at their outersides and thus become slightly reduced in diameter, so that any eliptical cross-section of the conduit at the curved portion will not interfere with proper spring action. Advanced methods of tube bending have reduced the tendency of the tube to become eliptical in cross-section at the bend, and ball tests have been conducted wherein a ball of a diameter that is just slightly smaller than the inside diameter of the curved tube, will pass freely through the tube.

It is preferable that the coil springs be closed, and ground, at their opposite ends, in order to present relatively flat surfaces for abutment with the slide block 35 and the abutment disc 42. In some instances where heavy duty springs are required, the convolutions of such springs become so large in cross-section as to offer considerable resistance to movement through the conduit 18. In such cases, it may be desirable to use a pair of coil springs in each conduit 18, one spring within the other, as shown in FIG. 3a. To prevent the convolutions of the inner and outer coil springs from interlocking, it is preferable to reverse the pitches of the springs, as shown. Also, it may be preferable that the two springs have different cross-sections. For example, the outer spring may have convolutions of round cross-section, and the inner spring may have a square cross-section.

DESCRIPTION OF OTHER EMBODIMENTS

In FIG. 4, my invention is embodied in a single wheel, stub axle construction, or a single axle, double-wheel construction, and parts similar to the foregoing embodiment will be designated by the same reference numerals, with the suffix $a$ added. As before, a mounting 10a is connected to the frame 12a of the vehicle. If the suspension is for a single wheel, stub axle construction, such as for a smaller trailer to be towed by an automobile, a beam 14a of the frame would be at or near the longitudinal center line of the frame, and only one mounting 10a would be required. It will be appreciated that a pair of spaced wheels could be mounted on the vehicle frame in like manner, to offer stability. On the other hand, if the suspension is for a single axle having wheels journalled on its opposite ends, a pair of laterally spaced and aligned mountings 10a would be respectively connected to the spaced pair of longitudinal frame beams, in the manner of the left-hand mountings shown in FIG. 1. Thus, it will be evident that the mountings are interchangeable, for use in either of the suspensions shown in FIGS. 1 and 4.

In the embodiment shown in FIG. 4, the end cap 43a is modified slightly to provide internal screw threads for receiving an adjusting rod 50 which has its inner end bearing against, or connected to, the disc 42a. The outer end of the rod 50 is provided with wrench flats 51, and a lock nut 52 may be threaded on the rod. The rod 50 provides a means for adjusting the compression of the coil spring 41a. When the rod is threaded in a direction to move the disc 42a inwardly of the conduit sections 25a, the spring is compressed to thus exert a greater downward force against the slide block 35a. The spring 41a may therefore be compressed a greater amount to adjust for increased weight on the vehicle. If the weight is not increased, the greater compression of the spring 41a will move the axle 16a downwardly so that larger diameter wheels may be carried by the axle. On the other hand, if the rod 50 is threaded in a direction so that the disc 42a is moved toward the free end of the conduit section 25a, a softer ride may be provided, and/or the weight of and on the vehicle will cause the slide block 35a and the axle 16a carried thereby to move upwardly in the housing 15a, so that smaller diameter wheels may be used.

In most coil springs the convolutions have a round cross-section as shown at 41.1 in FIG. 5. However, the convolutions may have other cross-sections, such as, for example, the flattened round cross-section shown at 41.2, or the square cross-section shown at 41.3.

As seen in FIG. 6, the conduits of any of the suspensions need not be a right angle bend, but may be formed to provide obtuse or arcuate angles between the rectilinear end portions of the conduit. In FIG. 6, the forward mounting 10a has a conduit 18b which is curved to form an acute angle between the conduit end portions 21b and 25b. The rearward mounting 11b has a conduit 18b which forms an obtuse angle between its conduit end portions 21b and 25b. The mountings 10b and 11b are connected to the vehicle frame 12b in the same manner as described before, with the facing conduit end portions 25b—25b in substantial axial alignment to accommodate operation of the compression rod 45b. The construction shown in FIG. 6 is ideally suited for a "beaver tail" truck or trailer, wherein a large diameter wheel 17b is carried by the forward mounting 10b, and a smaller diameter wheel 17b is carried by the rearward mounting 11b. Although the occasions for a smaller forward wheel and larger rearward wheel are not too numerous, this condition may be easily obtained by reversing the mountings 10b and 11b.

FIG. 7 discloses a double-axle equalizing wheel suspension which is similar to that shown in FIG. 1, and similar parts will bear the same reference numerals, but with the suffix c added. The construction of FIG. 7 not only provides axle wheel-base adjustment (that is adjustment of the spacing between axles), but also provides adjustment for weight compensation and wheel size.

As in FIG. 1, the mountings 10c and 11c in paired relation, are connected to respective beams 14c of a vehicle frame 12c. The compression rod 45c in this embodiment, is formed in two similar sections 55—55, each having its inner end abutting or connected to a respective disc 42c. The outer ends of the rod sections 55 are provided with opposite screw threads, to receive opposite ends of a turnbuckle 56.

If the mountings 10c and 11c are spaced the distance shown in FIG. 7, the turnbuckle 56 may be adjusted to compensate for vehicle weight and load, as well as for wheel size. For example, if the turnbuckle 56 is threaded so that the rod portions 55—55 are drawn toward each other, the two discs 42c will move toward the open end of conduit end portions 25c and relax the compressive force on respective springs 41c. This will provide a softer suspension for a lighter load, or will permit smaller wheels 17c to be used for the same load. On the other hand, if the turnbuckle 56 is threaded so that the discs 42c are moved further inward of conduit end portions 25c, the compressive force on the respective coil springs 41c will be increased, to provide a stiffer suspension for a heavier load, or to drive the slide blocks 35c downwardly and therefore provide for larger wheels.

The distance between wheel axles 16c may also be varied in the construction shown in FIG. 7. For example, if it is desired to shorten the distance between the wheel axles, one or the other (or both) of the laterally paired wheel mountings 10c, 11c may be unbolted from the frame beams 14c, and moved together to a desired new location, and again bolted in position. The frame beams may have pre-drilled holes (not shown) to define the new location, or holes may be drilled into the frame beams after the new location has been determined. Of course, it will be appreciated that the turn buckle 56 will have to be adjusted to exert proper force on the discs 42c. It is contemplated, with proper design and adjustment of parts, that the wheel axles 16c may be adjusted toward each other until the free ends of conduit portions 25c abut at the line 59. In this case, the turnbuckle will be located within such end portions and will have to be adjusted before the mountings have been bolted to the frame beams. It will be obvious that the distance between the axles 16c—16c may be increased by proper relocation of the mountings.

I claim:

1. A wheel suspension for a vehicle having a frame, a wheel for rolling along a travel surface, such as a roadway and the like, and an axle on which said wheel is mounted, comprising:
    a mounting for said axle whereby the latter may move vertically, said mounting having a portion connected to said frame and including a curved conduit,
    a coil spring within said curved conduit, the convolutions of said spring engaging the inner wall surface of said curved conduit so that said coil spring is axially flexed to follow the curvature of said conduit, one end of said spring bearing against said axle,
    abutment means against which the other end of said spring bears, and
    means for adjusting said abutment to compress said spring a selected amount.

2. A wheel suspension for a vehicle having a frame, a wheel for rolling along a travel surface, such as a roadway and the like, and an axle on which said wheel is mounted, comprising:
    a mounting for said axle whereby the latter may move vertically, said mounting having a portion connected to said frame and including a curved conduit,
    a coil spring within said curved conduit, the convolutions of said spring engaging the inner wall surface of said curved conduit so that said coil spring is axially flexed to follow the curvature of said conduit, one end of said spring bearing against said axle, abutment means against which the other end of said spring bears, said axle mounting having a lower portion providing an upright slide surface, and a slide block slidable along said slide surface, said axle extending transversely through said slide block and connected thereto.

3. The construction according to claim 2 wherein said axle mounting lower portion is formed by a pair of upright channel sections with respective legs facing but spaced from each other to provide a vertical space through which said axle may move vertically, a cap member secured in position across the lower ends of said channel sections to hold them in fixed relation, said curved conduit comprising a metal tube having its lower end connected to the upper ends of said channel sections to hold them in fixed relation, the inner surfaces of said channel sections providing said slide surface which is rectangular in cross-section, and said slide block having a cross-section complementary to said slide surface.

4. A wheel suspension for a vehicle having a frame, a wheel for rolling along a travel surface, such as a roadway and the like, and an axle on which said wheel is mounted, comprising:

a mounting for said axle whereby the latter may move vertically, such mounting having a portion connected to said frame and including a curved conduit terminating at one end above said axle, a coil spring within said curved conduit, the convolutions of said spring engaging the inner wall surface of said curved conduit so that said coil spring is axially flexed to follow the curvature of said conduit, one end of said spring extending through said conduit end and bearing against said axle, abutment means against which the other end of said spring bears, there being a pair of said axle mountings connected to longitudinally spaced portions of said frame for respectively mounting spaced axles, each mounting having a said curved conduit and a said coil spring therein, the abutment means of said mountings being slidable within respective conduits and facing each other in spaced relation, and force transmitting means between said abutment means, the foregoing construction providing an equalizing mechanism between axles wherein when one axle is moved upwardly it applies a compressive force upwardly against its coil spring, which force is transmitted by said force transmitting means to the coil spring for the other axle to apply a downward compressive force to the spring and in turn urge its related axle downwardly.

5. The construction according to claim 3 wherein a rubber block is disposed between facing surfaces of said axle and said slide block and is held against movement relative to said axle surface.

6. The construction according to claim 4 wherein the conduit portions in which said abutments are slidable are rectilinear and are axially aligned, and wherein said force transmitting means is a compression rod having its opposite ends adapted to transmit force to and from respective abutments.

7. The construction according to claim 6 wherein said compression rod is formed in two sections, each section having one end adapted to transmit force to and from a respective abutment, and a turnbuckle having opposite ends threaded on the opposite ends of said rod sections to selectively provide for adjustment of the spacing between said abutments and the spacing between said rectilinear portions of said conduit.

8. The construction according to claim 4 wherein a larger diameter wheel is mounted on one of the axles, and a smaller diameter wheel is mounted on the other of the axles.

9. The construction according to claim 4 wherein the curvature of one conduit forms an obtuse angle between its ends, and the curvature of the other conduit forms an acute angle between its ends.

10. The construction according to claim 4 wherein each axle mounting is adjustably connected to said frame to provide for axle alignment.

11. The construction according to claim 10 wherein each adjustable connection comprises a plurality of bolts passing through holes in the mounting and threaded into said frame, one bolt and hole fitting to provide a pivot about which the mounting may be swung, and the other of the bolt and holes fitting to permit shifting of the mounting about said pivot.

12. A wheel suspension for a vehicle having a frame including a pair of laterally spaced, longitudinally extending beams, said suspension also including a pair of axles underlying and extending cross-wise of said beams and spaced longitudinally thereof, and a pair of wheels on opposite ends of each axle, the improvement comprising:

a pair of mountings for respective opposite end portions of each axle, each pair of mountings being connected to respective beams in laterally aligned relation and each including an upright housing having a vertical recess providing an upright slideway for slidably receiving respective slide blocks mounted on opposite end portions of an axle, each housing having upright slots for passing respective axle end portions so that each axle may move vertically, a conduit associated with each housing, each conduit having a lower generally vertical end, a curved intermediate portion and an upper generally horizontal end, said lower conduit end being rigidly connected to its associated housing with its interior communicating with the latter's recess, a coil spring disposed within each conduit, the convolutions of said spring engaging the inner wall surface of the curved intermediate portion thereof so that the spring within said portion is axially flexed to follow the curvature of said intermediate portion, the lower end of each coil spring being generally vertical and disposed within its respective housing recess to bear against a slide block therein, and the upper end of each coil spring being generally horizontal and bearing against an abutment slidable within the upper generally horizontal rectilinear end of its associated conduit, said pairs of mountings being arranged so that the upper horizontal ends of the conduits of one laterally aligned pair are axially aligned with respective ones of the upper generally horizontal ends of the conduits of the other pair, and force transmitting means between the abutments in each pair of axially aligned conduit upper ends.

13. The construction according to claim 12 wherein each force transmitting means is a compression rod having its opposite ends adapted to transmit force to and from abutments in a respective pair of axially aligned conduit upper ends, to transmit thrust from one abutment to the other as one of the wheels strike a bump in the roadway.

14. The construction according to claim 13 wherein each compression rod is formed in two parts, the ends of which are adapted to transmit force to and from respective abutments, and a turnbuckle threaded on the other ends of said rod sections to selectively provide for adjustment of the spacing between said abutments and the spacing between axially aligned conduit upper ends.

* * * * *